United States Patent [19]

Raninen et al.

[11] Patent Number: 4,641,466
[45] Date of Patent: Feb. 10, 1987

[54] WINDOW

[75] Inventors: Jaakko Raninen; Heikki Savioja, both of Alavus; Antti Koivula, Sulkavankyla; Jorma Saariaho, Alavus; Reijo Sihto, Alavus; Yrjo Valimaki, Alavus, all of Finland

[73] Assignee: Oy Partek Ab, Parainen, Finland

[21] Appl. No.: 751,439

[22] Filed: May 8, 1985

[51] Int. Cl.$^4$ .............................. E06B 7/12
[52] U.S. Cl. ..................... 52/171; 52/209; 98/31
[58] Field of Search ............... 52/171, 209; 98/31

[56] References Cited

U.S. PATENT DOCUMENTS

| 2,513,993 | 7/1950 | Burton | 52/171 X |
| 3,982,475 | 9/1976 | Wild | 98/31 |

FOREIGN PATENT DOCUMENTS

| 0027581 | 10/1980 | European Pat. Off. | |
| 0027581 | 4/1981 | European Pat. Off. | 52/171 |
| 2037288 | 2/1971 | Fed. Rep. of Germany | |
| 2350614 | 4/1974 | Fed. Rep. of Germany | |
| 2608557 | 9/1977 | Fed. Rep. of Germany | |
| 55889 | 6/1979 | Finland | |
| 56050 | 7/1979 | Finland | |

Primary Examiner—Carl D. Friedman
Attorney, Agent, or Firm—Cushman, Darby & Cushman

[57] ABSTRACT

The invention relates to a window having a channel between its glasses, through which channel circulation and/or fresh air is brought into a room. The object is to provide a new window which can function as the only heating element of the room. This object is achieved by providing the glass facing the room with an electrically conductive layer, whereby the said glass functions as an electric heating element, and by providing the inwards facing surface of the outer glass with a coating reflecting the heat radiating outwards from the heating element almost entirely back into the room. To make the recovery of heat more effective, a fan with actuating and regulating devices is preferably arranged in the window structure.

9 Claims, 8 Drawing Figures

WINDOW

The present invention relates to a window provided with a channel for circulation air and/or fresh air.

The object is to provide a new window of this type which besides being a light opening and attending to air conditioning also takes care of warming up the room so efficiently that no other heating device is needed.

This is achieved by means of a window according to the invention mainly so, that the glass facing the room is formed into an electric heating element and that a surface of an outer glass is provided with a coating for reflecting heat radiating outwards from the heating element back into the room.

The outer glass of the window preferably is an insulating glass element with two glasses, whereby the coating reflecting heat is formed on the inner surface of the outer glass of the insulating glass element. The coating reflecting heat can be a similar electrically conductive layer as is used in the inner glass of the window.

Contrary to earlier windows, which always have been the coldest part of the wall mantle of a building causing a feeling of draught, a need of raising the room temperature (in winter the room temperature is desired to be higher than in summer) and a condensation effect inconvenient both esthetically and with respect to the durability, the window of the invention is the warmest part of the wall mantle, whereby e.g. draught can be avoided and, without anybody noticing, the temperature can be held lower inside the room than in rooms provided with known windows, due to which it is possible to save heating energy. The heating part serves as a radiating heater and since the heating is combined with circulation air heating, disadvantages, such as cold corners etc., relating to a conventional radiating heater can be avoided. Even in cold weather, no condensation effects caused by condensing water appear, because the surface temperatures of the window glasses are above the dew point.

Along with the rise of energy prices, buildings have been provided with additional insulations, whereby less fresh air passes through the structures and the conditions have in general become less comfortable.

A window according to the invention enables the intake of controlled and heated fresh (compensation) air without necessity to build inconvenient special air ducts or devices and enables a sufficient ventilation in rooms where at present fresh air is available only by opening the window, which particularly in cold weather is uncomfortable.

Because the surface temperature of the windows in present constructions is low in winter circumstances, the surface of the glass ought to be flushed with warm air. Due to this, radiators must always be located according to the windows and nevertheless, the temperature conditions are not the best possible. When an arrangement according to the invention is used, the heating situation reminds of heating by the sun through a window.

When modernizing heating, air conditioning and windows in old buildings, which in general are the objects to be overhauled, this can preferably be carried out by means of an arrangement according to the invention, whereby all functions can be installed in an old window opening without necessarily attacking all structures of the building.

A window of the invention makes radiator elements unnecessary and gives new possibilities for furnishing a room, a window needs no more be avoided because of chilliness.

A window of the invention is also advantageous in manufacturing, it can be built at a factory as a finished element provided with window, air conditioning and heating functions. The readiness for heating and air conditioning during building is improved thereby that the heating and air conditioning can be started at once after the element has been installed in its place and connected to the electric net. The new window also enables additional couplings, e.g. of an ion exchanger, an air humidifier and a burglar alarm.

Provision of a window glass with a heatable electric resistance is known as such, e.g. from the German Offenlegungsschrift 23 50 614, but the object has been to prevent ice or frost formation, why the electric resistance is located in the outer glass, whereby approximately half of the radiating heat is wasted. Contrary to that, by means of the solution of the invention it is possible to recover approximately 90% of the radiating heat, which makes the operation economically profitable. This succeeds due to the location of the heating element in the inner glass and due to the heat reflecting coating, a so-called selective glass, arranged in the outer glass. The function of a selective glass is based on the reflection of longwave heat radiation back into the room up to about 85%. The reflecting layer is formed by a very thin metal layer, which layer or coating can be manufactured by several different methods or of different materials, e.g. gold, silver, copper etc. A selective glass can either be installed in the insulating glass or it can e.g. be resinified together with another glass to one conglutinated set. Selective glasses suitable for this are available.

The regulation of the heating can be a continuous power regulation to set value by measuring the room temperature and the outside temperature and by regulating the voltage on the basis of the result. Additionally, a surface temperature sensor can be used for observing the surface temperature of the element to be heated, whereby it is possible to restrict the power on the basis of the measuring result.

In order to provide a flushing flow through the space between the window glasses, a fan can be arranged therein, whereby the amount of flushing air can be changed by regulating the speed of rotation of the fan on the basis of measuring temperature in the space between the window glasses. The regulation can also be carried out on the basis of the surface temperature desired for the heating element, which temperature can be e.g. 30° C. or 40° C. The regulation of the amount of interchange air can naturally also be influenced by the proportion between circulation air and fresh air, claims 2-9 define such arrangements.

In the following, the invention is described in more detail with reference to the attached schematic drawing.

In the drawing, an inlet channel for circulation air is marked by the reference numeral 1 and an inlet channel for fresh air by the reference numeral 4, the reference 2 is showing a regulating valve arranged at the junction of those channels, a so-called flushing channel between the window glasses is marked by the reference 3 and a channel leading through the upper part of the window into the room by the reference 6. An inner sash of the window is marked by 8 and an outer sash by 9, the window frames are marked by the references 10 and 11. In the upper frame 10 is arranged a fan 7 and a heat resistance 13 and e.g. an electric filter 15. In the inlet opening of channel 1 is arranged a circulation air filter 16.

Figure 1:
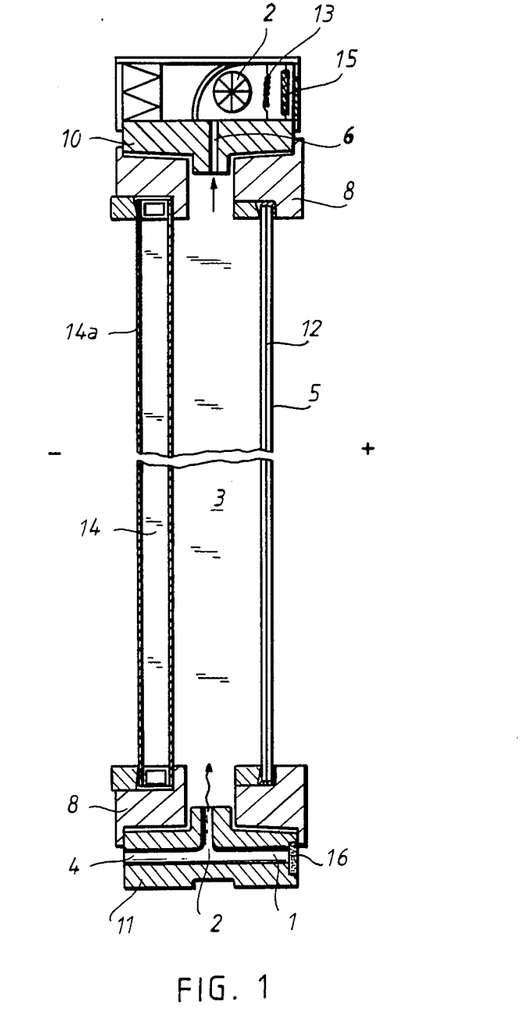
FIG. 1 is a vertical section of an embodiment of the invention.
Figure 8:
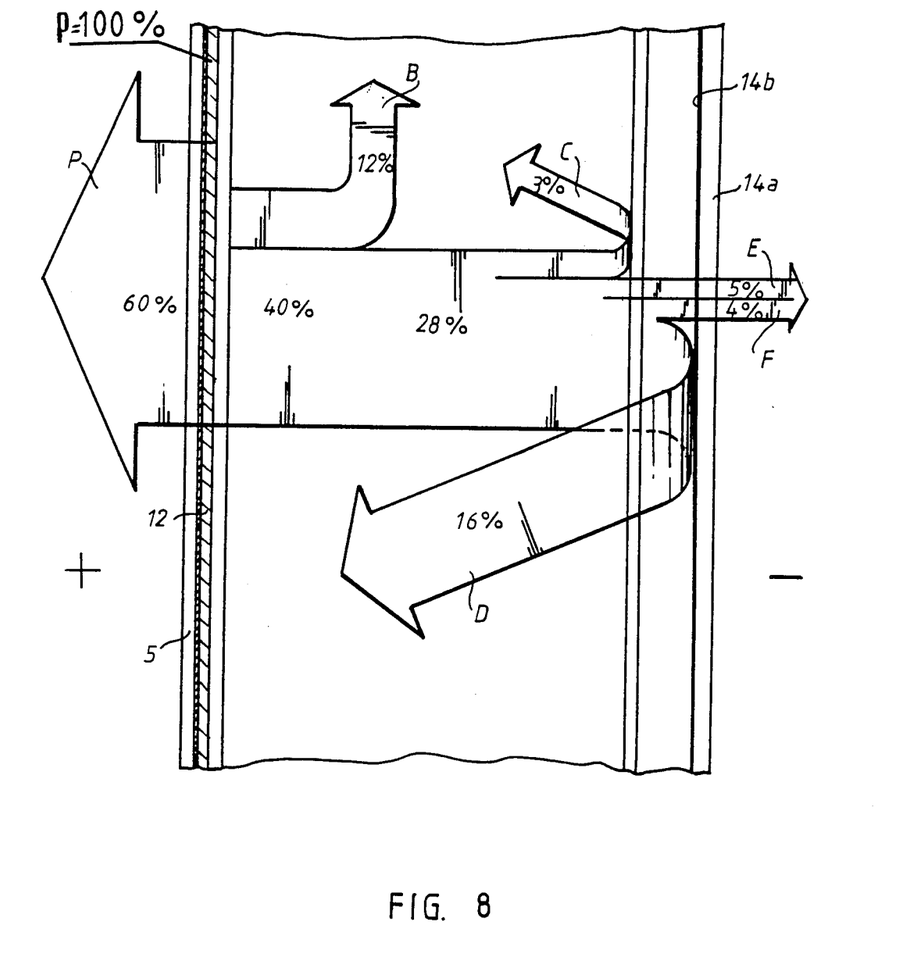
FIG. 8 illustrates how a window according to the invention recovers heat.

A window according to the invention is primarily characterized in that the inner glass 5 is provided with an electrically conductive layer 12 functioning as a heating element of the room and in that the outer part 14 of the window is formed by a so-called selective glass reflecting the greatest part of the heat radiating outwards from the heating element 12 back into the flushing channel 3 and the room. As illustrated in FIG. 1, the outer glass 14 of the window preferably is an insulating glass element with two glasses, whereby the inner surface of the outer glass 14a of the insulating glass element preferably is provided with a heat reflecting coating, a so-called selective coating. In FIG. 8 illustrating the energy balance of the window, this heat reflecting coating is marked by the reference numeral 14b.

Figure 2:
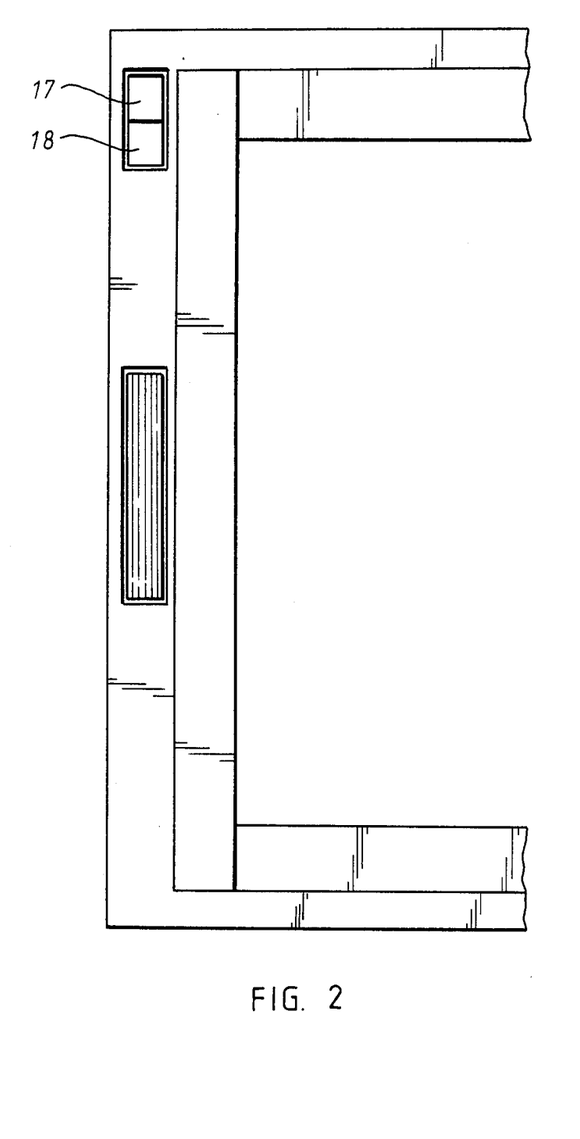
FIG. 2 illustrates a part of a window seen from the inside of the room.

It is also possible to provide the window with a control panel 17 and a regulating center 18, FIG. 2.

Figure 3:
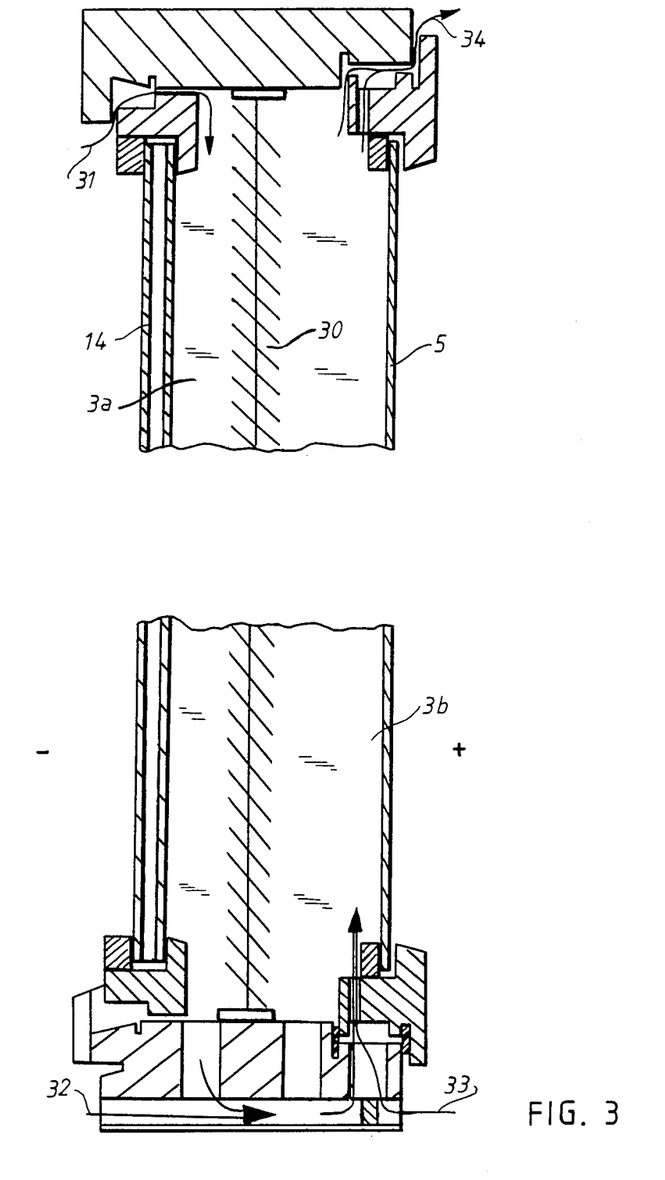
FIGS. 3-5 show vertical sections of alternative embodiments.
Figure 4:
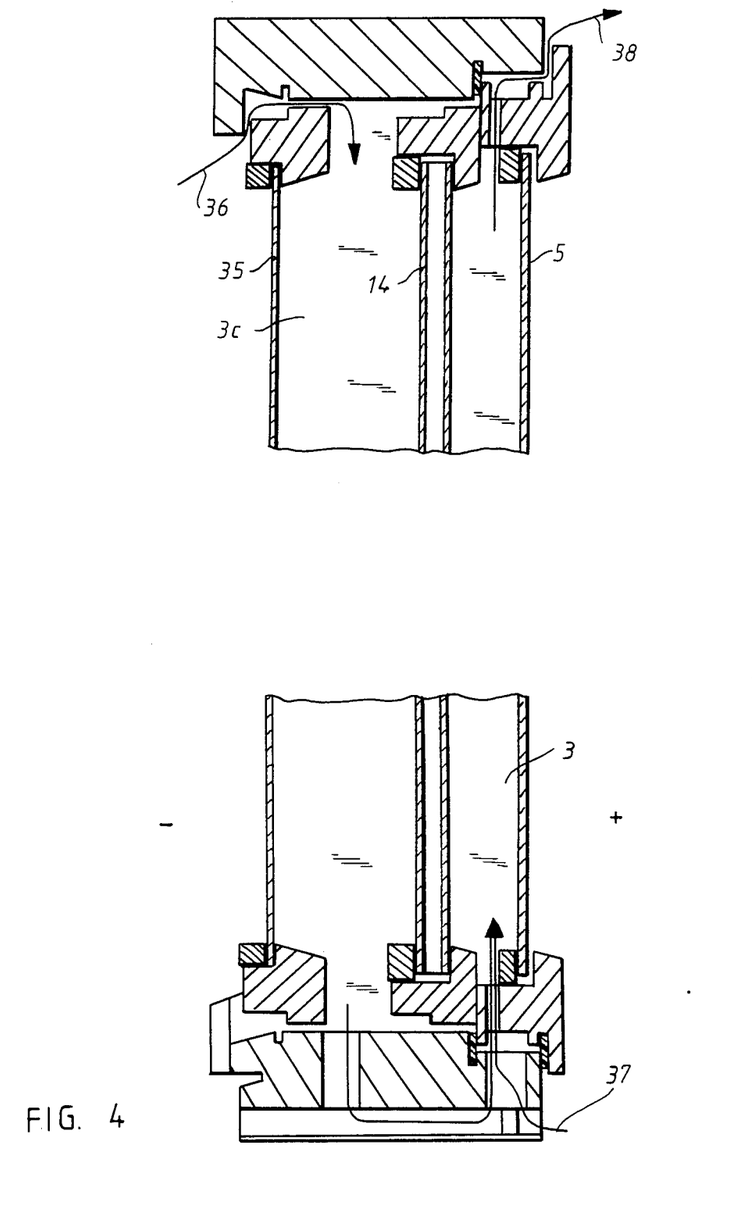
Figure 5:
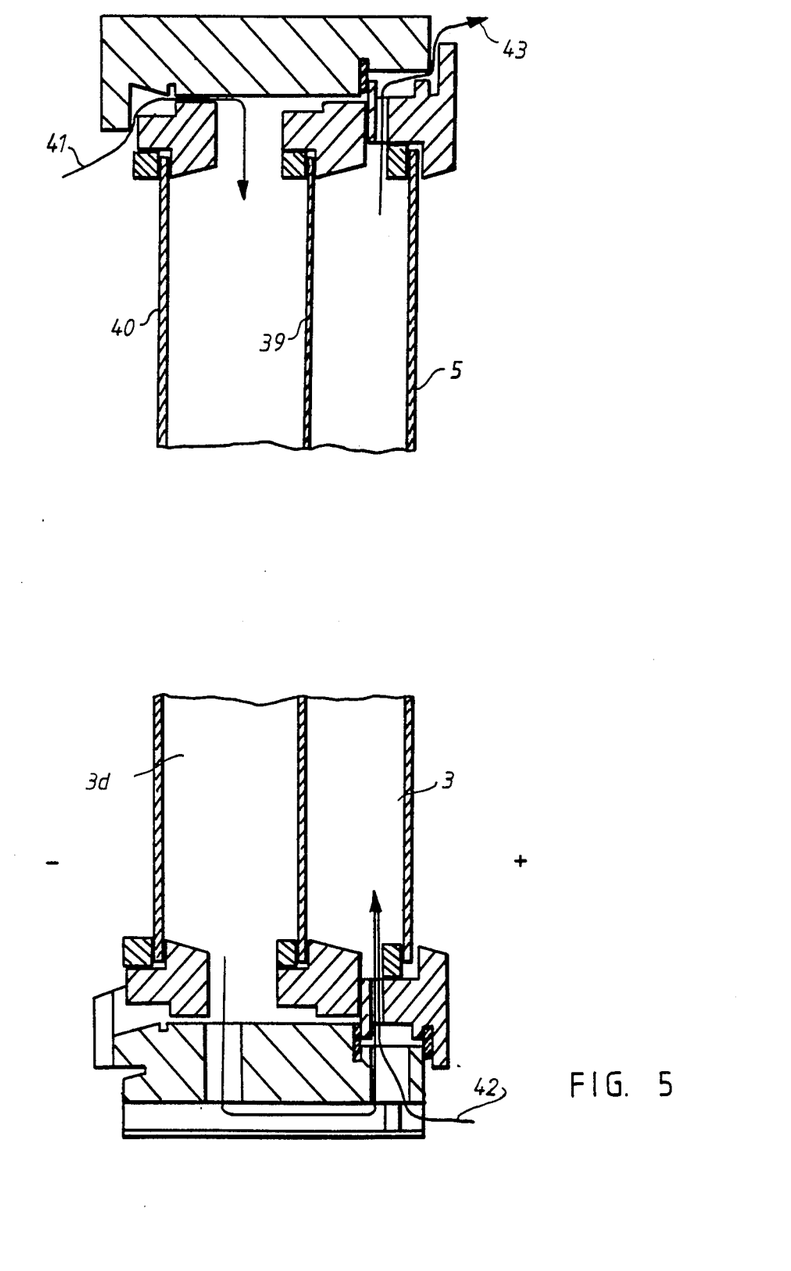

As to the heat losses of the window, it is preferable that the temperature difference between the outermost glass and open air is as small as possible. FIGS. 3, 4 and 5 show solutions where this has been considered in a better way than in the primary solution of FIG. 1. In FIG. 3, a jalousie, a curtain 30 or some other light permeable construction is arranged in the space between the inner glass 5 functioning as a heating element and the insulating glass element 14 functioning as an outer glass, and at least a part of the fresh air is taken in through the upper part of the window, arrow 31, into the space 3a between the curtain 30 and the element 14 and is led through that space to the lower part of the window, where it can be mixed with fresh air taken in from below, arrow 32, and in the lower part of the window the fresh air is further mixed with the circulation air coming from the room, arrow 33. The air flow mixed is heated in the space 3b between the heating element 5 and the curtain 30 and the warm air flows through the upper part of the window into the room, arrow 34.

In the structure of FIG. 4, an additional glass 35 is arranged outside the insulating glass element 14 and the fresh air preferably is taken in entirely through the upper part of the window, arrow 36, into the space 3c between this additional glass and the element 14 and is led through this space into the lower part of the window, where the fresh air is mixed with the circulation air coming from the room, arrow 37. The mixed air flow is heated in the space 3 between the insulating glass element 14 and the heating element 5 and the warm air flows through the upper part of the window into the room, arrow 38.

In FIG. 5, there are two separately installed glasses 39 and 40 outside the heating element 5. Corresponding to FIG. 4, arrow 41 points to the fresh air, arrow 42 to the circulation air and arrow 43 to the warm air flowing into the room. Either one of the glasses 39 and 40 is provided with a coating reflecting heat radiation.

Figure 6:
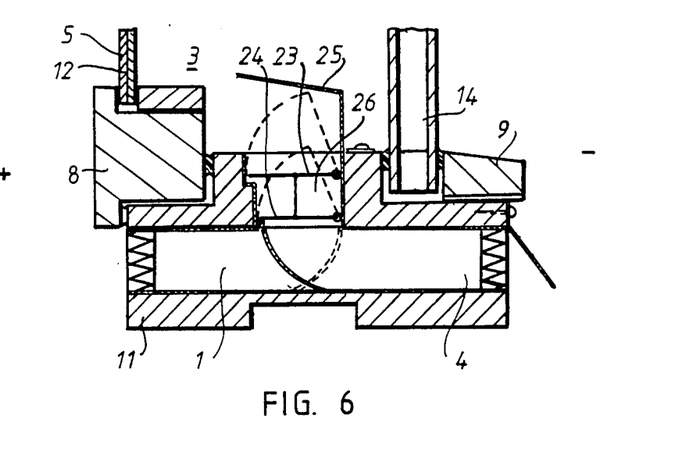
FIG. 6 is a vertical section of an arrangement located in the lower part of the window for mixing circulation air with fresh air in a proportion desired.
Figure 7:
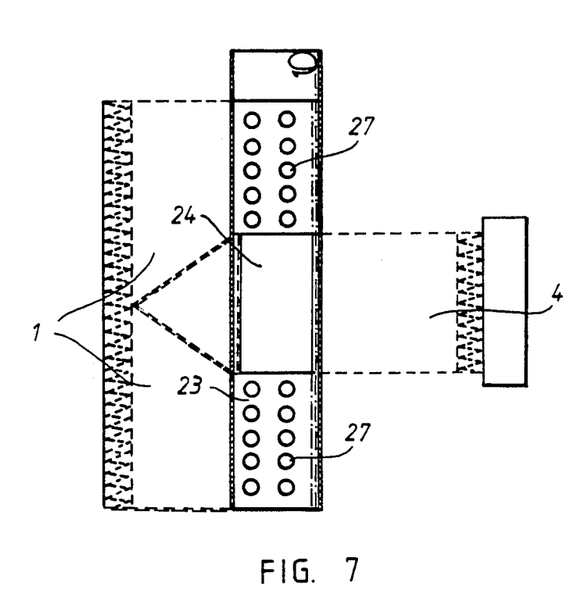
FIG. 7 shows the same arrangement from below.

FIGS. 6 and 7 illustrate a so-called air-handling unit, which can be arranged in the lower part of the window and by means of which the proportion between circulation air and fresh air can be regulated. The circulation air channel 1 and the fresh air channel 4 terminate parallelly in an opening 26 leading to the channel 3 between the window glasses preferably so that the fresh air channel 4 at least substantially is in the middle of the circulation air channel 1. The opening 26 is provided both with a regulating valve 23 for the circulation air channel and with a regulating valve 24 for the fresh air channel. The regulating valves 23 and 24 can according to FIG. 3 be connected to each other, whereby the regulating valve 23 preferably is provided with a perforation 27. The air flow coming into the channel 3 is preferably by means of a guide 25 directed against the inner glass of the window provided with a heating element 12. By means of the regulating valves 23 and 24 the proportion between circulation air and fresh air can be regulated so that the amount of fresh air to be taken in from outside is in a right proportion to the outside temperature so that no frosting occurs and the amount of fresh air still is sufficient. The regulating mechanisms of the regulating valves 23 and 24 can be manually operated or be connected to the regulating center 18 of the window and the regulation is preferably carried out on the basis of the temperature measurings (already) mentioned earlier. The air-handling unit can further be provided with filters 28, 29 for air cleaning.

The air-handling unit according to FIGS. 6 and 7 is illustrated in connection with the so-called primary solution of the window in FIG. 1, but naturally, air-handling units can as well be used in structures according to FIGS. 3–5.

FIG. 8 (approximately) illustrates the energy balance of a window of the invention as to the structure in FIG. 1. By means of the solutions in FIGS. 3–5, better results still can be achieved. As to these Figures, it shall additionally be mentioned that e.g. by means of a fan, arranged in the lower part of the window, the air flows between the glasses can be turned into the opposite direction so that warm air is led into the room through the lower part of the window; the solutions of the Figures are, however, more natural.

We claim:

1. A window comprising an inner glass and an outer glass and provided with a channel for circulation air and/or fresh air, characterized in that the inner glass facing a room is formed into an electric heating element and that a surface of the outer glass is provided with a coating for reflecting heat radiating outwards from the heating element back into the room.

2. A window according to claim 1, characterized in that the glass facing the room is provided with an electrically conductive layer.

3. A window according to claim 1, characterized in that the outer glass of the window is an insulating glass element with two glasses and that the heat reflecting coating is formed on a surface of any glass of the insulating glass element.

4. A window according to claim 1 characterized in that the heat reflecting coating is a similar electrically conductive layer as the layer used in the inner glass of the window.

5. A window according to claim 1 characterized in that the fan with actuating and regulating devices is arranged in the window, for recovering heat collected in the channel between the glasses by means of air flow.

6. A window according to claim 1 characterized in that a jalousie or the like is arranged in the channel between the window glasses, that at least a part of the fresh air is arranged to flow through the upper part of the window into the space between the jalousie and the outer glass and that the common flow of fresh air and circulation air is directed through the space between the inner glass and the jalousie into the room.

7. A window according to claim 1 characterized in that outermost there is an additional glass, that at least a part of the fresh air is arranged to flow through the upper part of the window into the space between the outermost glass and the middle glass and that the common flow of fresh air and circulation air is directed through the space between the inner glass and the middle glass into the room.

8. A window according to claim 1 characterized in that the window is provided with a device for regulation of the proportion between the circulation air and the fresh air.

9. A window according to claim 8, characterized in that the device comprises a guiding element for directing the air flow coming into the channel between the window glasses against the glass serving as a heating element.

* * * * *